Sept. 2, 1958  M. S. KRUSE  2,849,805
RETRACTABLE PLUMB BOB
Filed March 29, 1954

INVENTOR.
MELVIN S. KRUSE
BY HIS ATTORNEYS.
HARRIS, KIECH, FOSTER & HARRIS

United States Patent Office 2,849,805
Patented Sept. 2, 1958

2,849,805

RETRACTABLE PLUMB BOB

Melvin S. Kruse, Whittier, Calif.

Application March 29, 1954, Serial No. 419,435

9 Claims. (Cl. 33—217)

My invention relates to plumb bobs and more particularly to a retractable plumb bob or line retriever.

Prior retractable plumb bobs have included spring-biased reels journaled about pins or stub shafts traversing a chamber within a housing, the biasing action of a wind-up spring being resisted by a mechanical locking device. As a consequence they have never gone into wide use because, among other reasons, of the inconvenience in withdrawing the line to a desired position and then locking it by a locking means which usually requires grasping the housing in one hand and actuating the locking device with the other.

It is an object of the present invention to eliminate this inconvenience and to provide a plumb bob which is stable at substantially any position of withdrawal of the line without the necessity of using a mechanical locking device. In this connection, it is an object of the invention to devise a plumb bob in which there is a unique frictional relationship between the line and a friction wall, typically a structure in which the friction wall has an outwardly facing friction surface removed sidewardly from the wound line on the reel, the line frictionally engaging such friction surface as a function of the weight imposed on the line by the suspended plumb bob. If it is desired to shift the bob to another elevation, it can be withdrawn against such friction or lifted to relieve the friction and permit the spring to wind the reel to keep the line taut. It is an object of the invention to provide a simple structure of this character.

It is a further object of the invention to provide a retractable plumb bob in which the reel is journaled directly within the housing without the use of a pin or stub shaft. In this connection, the invention contemplates a reel having flanges which peripherally engage an arcuate wall of the housing so that the journaling action is directly between such flanges and the housing.

A further object of the invention is to provide a retractable plumb bob in which the bob and the housing can be detachably connected, thus permitting the bob and the housing to be carried as a unit but with the bob in position to be instantly withdrawn when the housing is suspended from its upper end.

Further objects lie in the provision of a plumb bob which is economical to make, foolproof in operation, and compact, yet which has features making it very easy to use by engineers or transit men, even under conditions in which a long length of line must be drawn from the casing to permit the bob to be at the desired elevation. Additional objects and advantages will be apparent to those skilled in the art from the herein contained description of two exemplary embodiments of the invention.

Referring to the drawing.

Figure 1:
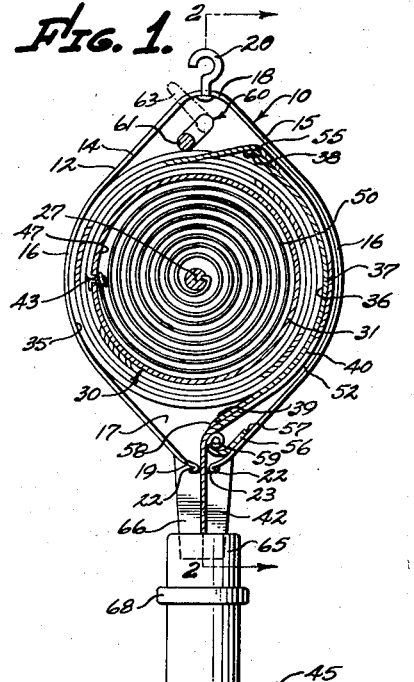
Fig. 1 is a vertical sectional view of one embodiment of the invention, showing the plumb bob in almost fully retracted position preparatory to being united detachably with the housing.
Figure 2:
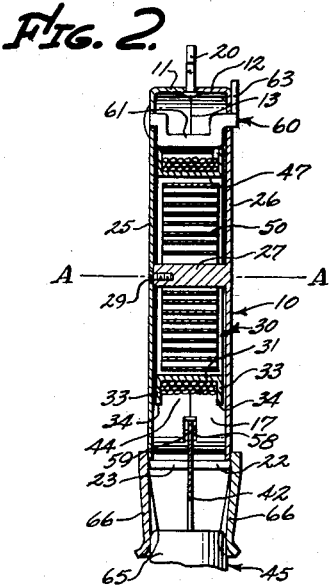
Fig. 2 is a vertical sectional view taken along the line 2—2 of Fig. 1.

Referring particularly to Figs. 1 and 2, the invention is shown as including a housing 10, usually made of mating halves 11 and 12 meeting at a mid-plane 13, this housing including peripheral walls 14 and 15 each having an arcuate portion 16 substantially concentric with an axis A—A traversing a chamber 17 of the housing. The housing has an upper attachment portion 18 and a lower line-receiving portion 19. The former has a top portion perforated to receive a swivel hook 20 which serves to suspend the housing from a transit, level or structure. The line-receiving portion 19 is formed of side walls extending from the arcuate portions 16 and converging toward each other to terminate in bent-back portions 22 forming a slot or opening 23 bounded by rounded walls formed, for example, by the portions 22.

The housing 10 includes side faces or walls 25 and 26 joined to the walls 14 and 15 and paralleling each other on opposite sides of the chamber 17. A stud 27 extends from the wall 26 and comprises the means for detachably connecting the mating halves 11 and 12 together. In this connection, it is shown as including a threaded opening receiving a screw 29 traversing the wall 25 and detachably holding the halves 11 and 12 together.

Within the chamber 17 is a reel 30 having a circular bottom wall 31 with spaced flanges 33 extending radially therefrom, these flanges providing circular peripheries 34 sized to be journaled by engaging the housing 10, e. g., by engaging the inner surface 35 of one of the arcuate portions 16 on one side and an inner friction surface 36 of a friction member 37 on the other side. In the illustrated embodiment, this forms the exclusive means for journaling the reel 30 to turn about the axis A—A, the stud 27 having no such function. The friction member 37 is secured to one of the side walls and extends in this embodiment completely across the chamber 17 to abut the other side wall. It may, for example, be welded to the side wall 25 at positions 38 and 39. The friction member 37 has an outer friction wall 40 displaced substantially to one side of the axis A—A and the circular bottom wall 31 of the reel 30. A line 42 is wound on the reel with its innermost end connected thereto at 43. The multiple turns of the wound line occupy a line space 44 outside the wall 31 between the flanges 33. To the outermost end of the line is connected a plum bob 45 of concentional design. Within the circular bottom wall 31 of the reel 30 is a spring space 47 surrounding the stud 27. A spiral spring 50 is wound therein with its inner end connected to the housing 10 through the stud 27 and with its outer end connected to the reel 30, such connections being made by any conventional means. The spring 50 respectively winds and unwinds as the line 42 is pulled out of or permitted to enter the slot opening 23 of the housing. It biases the line inwardly and tends to retract the plumb bob 45. However, its retractive force varies with the degree to which it is wound and thus with the length to which the line 42 is drawn out. Correspondingly it cannot counterbalance the plumb bob at all withdrawn positions.

To compensate for this and to form a frictional holding means for the line 42, this line does not move from the opening 23 directly to the already-wound turns. Instead, it extends through an arcuate or curved passage 52 between the friction member 37 and the adjacent arcuate portion 16 of the housing. The line 42 thus presses against the outer friction wall 40 of the friction member 37, the force depending upon the spring tension, tending to draw the line in, and the weight of the plumb bob, tending to draw the line out. These opposing actions induce tension in the line, holding it against the outer friction wall 40 and frictionally retaining the plumb bob against further withdrawal at substantially any position, so long as the weight of the bob keeps the line 42 taut. However, any manual lifting of the bob will relieve the tension in the line and the frictional pressure against the surface of the outer friction wall 40, permitting the spring to retrieve the line as fast as the bob is raised. Conversely, it has been found that by pulling on the bob 45 the line 42 will slide along the outer friction wall 40 against the restraining action of the spring 50 without breaking the line or inducing undue tension therein. As a consequence, when the device is hanging from the hook 20, the bob 45 can be pulled downward or raised and will stay in the position in which it is stopped.

It should be recognized that this desirable friction between the line 42 and the outer friction wall 40 will desirably result from an extended line of contact therebetween. Further, the line 42 must be substantially displaced sidewardly from any line joining the upper attachment portion 18 and the opening 23. In fact, it is desirable that the line be displaced sidewardly a distance greater than the radius of the reel 30 and that the line wind onto the upper portion of the reel. The friction wall 40 thus should desirably extend from a position below the horizontal plane of the axis A—A to a position above this plane. The upper end of this wall 40 is preferably bent to form a rounded shoulder 55 over which the line slides. It has been found that if the rounded shoulder 55 is relatively wide to correspond at least to the spacing of the flanges 33, it will act as a self-leveling winding expedient, guiding the line to wind in smooth layers, as shown, and avoiding such piling as would prevent the free action of the reel. The lower end of the wall 40 is desirably bent back on itself to form a tongue 56 secured at 57 to the housing. Along the bend, a slot 58 is cut for the line, leaving a tongue 59 which is curved to present a rounded shoulder over which the line 42 slides in reaching the opening 23, which is desirably directly below such rounded shoulder.

In the event a positive lock for the reel 30 is desired, the invention may include a friction latch 60 having portions pivoted in the walls 25 and 26 with an intermediate eccentric portion 61 engageable with the periphery 34 of at least one flange 33 when a lever 63 is turned. This lever may be directly connected to the latch 60 at a position outside the housing 10.

To secure the plumb bob 45 detachably to the housing when not in use, Figs. 1 and 2 show means depending from the lower or line-receiving portion of the housing to grip an upper portion 65 of the plumb bob. Preferably, the attachment is by spring means depending from the housing, e. g., a pair of spring members 66 shaped to conform to the periphery of the upper portion 65 and having innermost portions which may slip beneath a circular bead 68 of the plumb bob when the top of the plumb bob nears or seats against the portions 22 of the housing.

Figure 3:
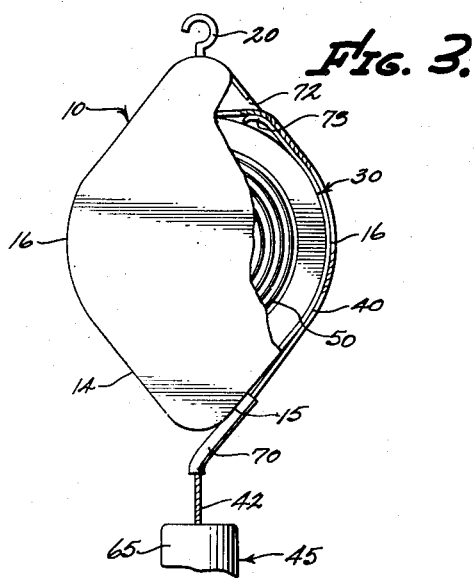
Fig. 3 is a view, similar to Fig. 1, showing an alternative construction.

In the embodiment of Fig. 3, the outer friction wall 40 is one of the exterior walls of the housing 10. Thus, the line 42 passes through a guide tube 70 secured to the peripheral side wall 15 and passes around the corresponding arcuate portion 16 which here forms the friction member. The line passes into the housing near the top of the reel 30 through an opening 72 which extends for substantially the complete width of the line space 44. A curved lip 73 guides the line to the reel and tends to cause the line to wind in smooth layers without local piling such as might cause the wound line to engage the inside of the housing 10. The desirable friction action is placed on the line as before, but is here the result of engagement of the line with an external friction wall 40, rather than an internal wall as in Figs. 1 and 2.

Various modifications of the invention will be apparent to those skilled in the design of retractable line devices from the embodiments illustrated and falling within the scope of the appended claims.

I claim as my invention:

1. A retractable plumb bob including: a housing having an internal surface having circular portions disposed about and on opposite sides of a horizontal axis; suspension means at an upper housing position, said housing providing a narrow opening at a substantially diametrically opposite position, said positions being spaced from each other on a vertical axis; a reel including a flange means having a circular periphery, said reel being journaled about said horizontal axis in said housing exclusively by engagement between said circular periphery and said circular portions of said internal surface, said reel have a bottom wall separating an inner spring space therewithin from an outer line space therewithout; a spiral spring in said inner spring space and providing one end secured to said reel; means for securing the other end of said spiral spring against movement whereby said spring respectively winds and unwinds upon turning of said reel in opposite directions; a line wound in said outer line space and extending through said narrow opening; and a plumb bob secured to said line, said line feeding tangentially onto said reel in a direction generally away from one of said circular portions as said line winds on said reel upon lifting of said plumb bob, the weight of said plumb bob when hanging from said line urging said reel in an opposite direction to frictionally engage said circular periphery of said flange means and said one circular portion.

2. A retractable plumb bob, including: a housing having an upper attachment portion and a lower line-receiving portion having a narrow line-receiving opening; a reel journaled to turn within said housing, said reel having a circular bottom wall and flanges extending outwardly therefrom to define a line space outside said bottom wall, the space inside said circular bottom wall being a spring space, said flanges having circular peripheries; a spiral spring within said spring space having inner and outer ends respectively fixed to said housing and to said reel; a line wound on said reel in said line space; a friction wall of substantial length on said casing spaced to one side of the axis of rotation of said reel, and extending concentric therewith from a position near the lowermost peripheries of said flanges to a position near the uppermost peripheries of said flanges to have a length of at least a major fraction of the semicircle of the flange peripheries, said line extending from said reel longitudinally along and in frictional contact with said friction wall and through said narrow line-receiving opening of said housing; and a plumb bob secured to said line.

3. A retractable plumb bob as defined in claim 2 in which at least a large portion of said friction wall is to one side of a line joining said upper attachment portion and said lower line-receiving portion of said housing, and in which said flanges provide peripheries journalling on the inner surface of said friction wall, said friction wall providing a smooth curved outwardly-facing friction surface engaged by said line, the weight of said plumb bob maintaining said line pressed against said friction surface to restrain said line against movement relative to said housing until said plumb bob is lifted to relieve the pressure of said line against said friction surface.

4. A retractable plumb bob as defined in claim 3 in which said housing provides enlarged internal zones respectively adjacent said upper attachment portion and said line-receiving opening, and in which said friction wall is a wall inside said casing and spaced therefrom to define a line-receiving zone, said friction wall terminating in a rounded end over which said line moves to and from said reel, said rounded end being in one of said enlarged internal zones.

5. A retractable plumb bob including: a housing having an arcuate inner surface substantially concentric with a horizontal axis traversing the interior of said housing, said housing providing an attachment means and a narrow line-receiving opening at positions at top and bottom ends of said housing, respectively, said housing including two side portions; a stud detachably joining said side portions, said stud extending parallel and adjacent said axis; a reel having a bottom wall and two flanges extending outwardly therefrom to define a line space outside said bottom wall between said flanges, there being a spring space within said bottom wall, said flanges having circular peripheries slidably engaging said inner surface of said housing and thereby journaling said reel in said housing, said stud traversing said spring space; a spiral spring in said spring space, said spring having inner and outer ends; means for connecting said inner end of said spring to said stud; means for connecting said outer end of said spring to said reel to bias said reel toward wound position; a line wound about said reel in said line space; a friction wall of substantial length on said casing spaced to one side of said axis, said line extending from said reel in a tangential direction to the exterior of said friction wall, thence longitudinally along and in frictional contact with said friction wall and thence through said narrow line-receiving opening of said housing; and a plumb bob secured to said line, said reel being laterally movable toward said inner surface, the bias of said spring and the weight of said plumb bob urging said circular peripheries frictionally against said inner surface and maintaining said line pressed against said friction wall to restrain said line against movement relative to said housing until said plumb bob is lifted to relieve the pressure of said line against said friction wall.

6. A retractable plumb bob as defined in claim 1 in which said housing is formed of two mating side portions, and in which said means for securing the other end of said spring against movement includes a stud detachably joining said side portions, said stud extending centrally through said inner spring space free of journalling engagement with said reel to permit lateral bodily shifting of said reel within said housing under a balance of the forces exerted thereon by said spring and by said line.

7. A retractable plumb bob, including: a housing having an upper attachment portion and a lower line-receiving portion having a narrow line-receiving opening; a reel journalled to turn within said housing, said reel having a circular bottom wall and flanges extending outwardly therefrom to define a line space outside said bottom wall, the space inside said circular bottom wall being a spring space; a spiral spring within said spring space having inner and outer ends respectively fixed to said housing and to said reel; a line wound on said reel in said line space; a friction wall of substantial length spaced to one side of the axis of rotation of said reel, said friction wall being an external wall of said housing, said line extending from said reel longitudinally along and in frictional contact with said friction wall and through said narrow line-receiving opening of said housing; and a plumb bob secured to said line.

8. A retractable device for plumb bobs and the like inducing tension in a supporting line, said device including: a housing having a circular wall means substantially concentric with a horizontal axis, said housing having suspension means at an upper position and a narrow line-receiving opening at a diametrically opposite lower position; a reel including a pair of flanges having circular peripheries substantially conforming in curvature to the inner surface of said circular wall means and sliding thereagainst to journal said reel in said housing, said reel having a bottom wall and a line space outside said bottom wall between said flanges; a line wound on said reel in said line space, said line extending from said reel in a direction tangential to a circle about said horizontal axis to a position outside and thence along an outer circular surface of said wall means to a position below said reel and thence through said line-receiving opening of said housing; and a spring biasing said reel in a direction to wind said line on said reel when weight-induced tension on said line is relieved, said tension exerting a force on said reel substantially in said tangential direction to move said flanges into frictional engagement with said inner surface of said wall means, thus tending to retard the turning of said reel under the action of said spring.

9. A retractable device for plumb bobs and the like which induce a tension in a supporting line, said device including: a housing having a suspension means at an upper portion and a narrow line-receiving opening at a diametrically opposite lower portion, said housing providing a circular wall having an inner surface bounding a reel space and an outer surface forming a friction surface; a reel free to move in said reel space both rotatively and laterally in a direction toward and away from a portion of said inner surface, said reel having a circular periphery frictionally engaging said portion of said inner surface when drawn theretoward; a line wound on said reel and extending laterally therefrom in a direction tangential to a circle about the center of the reel to a position outside said circular wall and thence along said outer friction surface thereof to and through said line-receiving opening; and a spring biasing said reel in a rotative direction to wind said line on said reel when weight-induced tension in said line is relieved, said tension acting to draw said periphery of said reel frictionally against said inner surface of said circular wall with a force depending upon the amount of said tension.

References Cited in the file of this patent

UNITED STATES PATENTS

| 599,178 | Gwilliam et al. | Feb. 15, 1898 |
| 1,043,295 | Burns | Nov. 5, 1912 |
| 1,266,214 | Colby | May 10, 1918 |
| 1,467,840 | Crogan | Sept. 11, 1923 |
| 1,837,234 | Salzman | Dec. 22, 1931 |

FOREIGN PATENTS

| 268,892 | Switzerland | Jan. 3, 1951 |